United States Patent
Rangaswami et al.

(10) Patent No.: US 9,652,345 B2
(45) Date of Patent: May 16, 2017

(54) TECHNIQUES AND SYSTEMS FOR LOCAL INDEPENDENT FAILURE DOMAINS

(71) Applicants: Raju Rangaswami, Davie, FL (US); Saman Biook Aghazadeh, Miami, FL (US); Steven Lyons, Miami, FL (US)

(72) Inventors: Raju Rangaswami, Davie, FL (US); Saman Biook Aghazadeh, Miami, FL (US); Steven Lyons, Miami, FL (US)

(73) Assignee: The Florida International University Board of Trustees, Miami, FL (US)

( * ) Notice: Subject to any disclaimer, the term of this patent is extended or adjusted under 35 U.S.C. 154(b) by 50 days.

(21) Appl. No.: 14/863,570

(22) Filed: Sep. 24, 2015

(65) Prior Publication Data

US 2017/0091055 A1    Mar. 30, 2017

(51) Int. Cl.
    *G06F 11/00*     (2006.01)
    *G06F 11/20*     (2006.01)
    *G06F 3/06*     (2006.01)

(52) U.S. Cl.
    CPC .......... *G06F 11/2069* (2013.01); *G06F 3/065* (2013.01); *G06F 3/067* (2013.01); *G06F 3/0619* (2013.01); *G06F 11/2094* (2013.01); *G06F 2201/805* (2013.01)

(58) Field of Classification Search
    USPC .................................................... 714/6.1, 6.3
    See application file for complete search history.

(56) References Cited

U.S. PATENT DOCUMENTS

| | | | | |
|---|---|---|---|---|
| 8,972,478 B1 * | 3/2015 | Storer | ..................... | G06F 3/061 709/201 |
| 2007/0106712 A1 * | 5/2007 | Yamato | ............... | G06F 11/2064 |
| 2009/0125691 A1 * | 5/2009 | Nakanishi | ........... | G06F 11/2069 711/162 |
| 2016/0092304 A1 * | 3/2016 | Tabrizi | ................ | G06F 11/1072 714/6.24 |
| 2016/0110249 A1 * | 4/2016 | Orme | .................... | G06F 3/0619 714/6.24 |

* cited by examiner

*Primary Examiner* — Sarai Butler
(74) *Attorney, Agent, or Firm* — Saliwanchik, Lloyd & Eisenschenk

(57) ABSTRACT

Techniques and systems are described for enabling local independent failure domains in a host server or datacenter environment. Included is a locally-attached independent failure device (LA-IFD) with an independent data buffer and a local communications bus for attaching to a host server. Techniques for a communications protocol between the LA-IFD and its host server are provided, including: receiving a request to write a data segment to persistent storage; synchronously storing the data segment in a buffered data segment at the LA-IFD and initiating an asynchronous update of the data segment at a remote storage system; sending a write acknowledgement indicating completion to the requestor; and, after receiving a completion notification from the remote storage system, removing the buffered data segment from the LA-IFD. In some cases, techniques allow a host server and LA-IFD pair to monitor one another for failures and implement a modified protocol in the event of unavailability.

12 Claims, 8 Drawing Sheets

US 9,652,345 B2

TECHNIQUES AND SYSTEMS FOR LOCAL INDEPENDENT FAILURE DOMAINS

BACKGROUND

As computing applications have moved increasingly toward a "cloud service" computing model, distributed computing architectures have been developed to meet the performance requirements of servers at the cloud service datacenter. One such architecture physically or logically separates the computation domain and the storage domain. Another architecture uses distributed replicated storage, where a host server replicates its data to remote servers, often in diverse geographic locations. The replicated storage at remote servers may provide, for example, better throughput to nearby geographic locations or better failure isolation, since distant localities are less likely to be affected by the same events such as power or network outages.

With these new architectures, many high-performance servers in the datacenter either locally cache, or store a copy of the data in a distributed storage system or, in the case of a centralized storage system, locally cache the remotely-stored persistent data. Such caching is performed in order to improve data access performance. When an application using the cloud service needs to update the data being used from a local cache or store, challenges can arise due to data transfer latencies between the layers of a distributed architecture.

BRIEF SUMMARY

To respond to these challenges, techniques and systems are described for enabling local independent failure domains in a host server or datacenter environment. Embodiments of the subject invention include a locally-attached independent failure device (LA-IFD) with an independent data buffer and a local communications bus for attaching to a host server. Embodiments also include program instructions for implementing a local independent failure domain communications protocol between an LA-IFD and its host server. Some embodiments include techniques allowing a host server and LA-IFD pair to monitor one another for failures and implement a modified protocol in the event of unavailability.

A method of enabling local independent failure domains can include receiving, from a requestor application, a request to write a data segment to a persistent storage. The data segment is synchronously stored in a buffered data segment at a locally-attached independent failure device (LA-IFD), and an asynchronous update of the data segment is initiated at a remote storage system which stores a copy of the data segment. Following this, a write acknowledgement indicating completion of the request to write the data segment is sent to the requestor application, freeing the requestor application from a blocking wait while data is updated or replicated on a remote storage system. After receiving a completion notification from the remote storage system that the asynchronous update is complete, the buffered data segment can be removed from the locally-attached independent failure device.

Local independent failure domains may improve blocking performance on a host server while maintaining expected scalability and data integrity levels. In a traditional environment without local independent failure domains, the application and the host server would block for an entire synchronous update operation at the remote storage. In contrast, in embodiments described herein, blocking in the application layer occurs only between a write request and a write acknowledgement; blocking in the host server only occurs during the short time the update request is being written to the LA-IFD and issued asynchronously to the remote storage system. Less time spent in blocking waits can improve both apparent performance for the user of the application and resource management/utilization (e.g., processor and memory usage) on the host server.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1A:
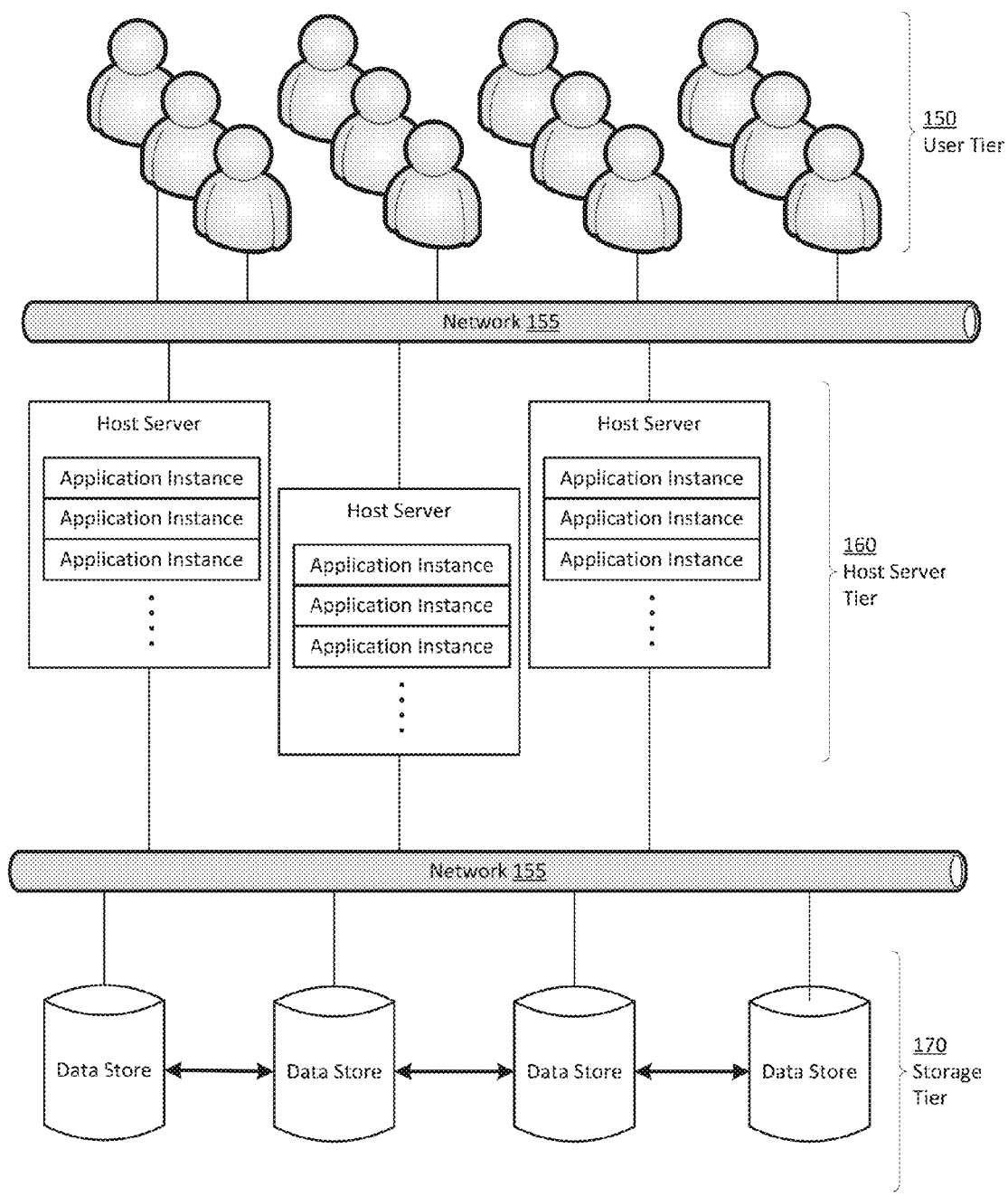
FIG. 1A shows a simple example of components in a scalable data center model.

Techniques and systems are described for enabling local independent failure domains in a host server or datacenter environment. FIG. 1A shows a simple example of components in a scalable datacenter model. In FIG. 1A, users in the user tier 150 utilize applications over a network 155 through their devices. Each may generate an application instance on a host server in the host server tier 160. The number of host servers in the host server tier 160, as well as the number of application instances on each server, may expand dynamically in response to the number of users actively using the application in the user tier 150. In order to accommodate this dynamic scalability of host servers in the host server tier 160, the host servers may connect over the network 155 to a set of distributed data stores in a storage tier 170. The data stores may be replicated to reduce loading on any particular data store as the number of host servers grow. Like the host servers, the number of data stores can grow or shrink to accommodate the user demand on the system.

In a scalable datacenter environment such as the one shown in FIG. 1A, a host server may cache certain data locally to improve system performance. Thus, a request by an application to update data can cause the host server to update data on a remote storage system (which can contain several remote data stores and/or servers) over a network connection. When the network connection is slow or congested, the data update operation can affect the performance of the host server, for example, when threads of execution on the host server "block" while waiting for the update to the remote storage system to complete. A blocking wait not only lengthens apparent wait times for a user of an application, a blocking wait also increases processor and operating system overhead because these components must manage the additional thread-switching activities. Generally, the more blocking waits a host server must perform, the less well it can manage its processing load and the fewer operations it can perform; this, in turn, causes a datacenter to require more host servers to distribute the processing load.

Figure 1B:
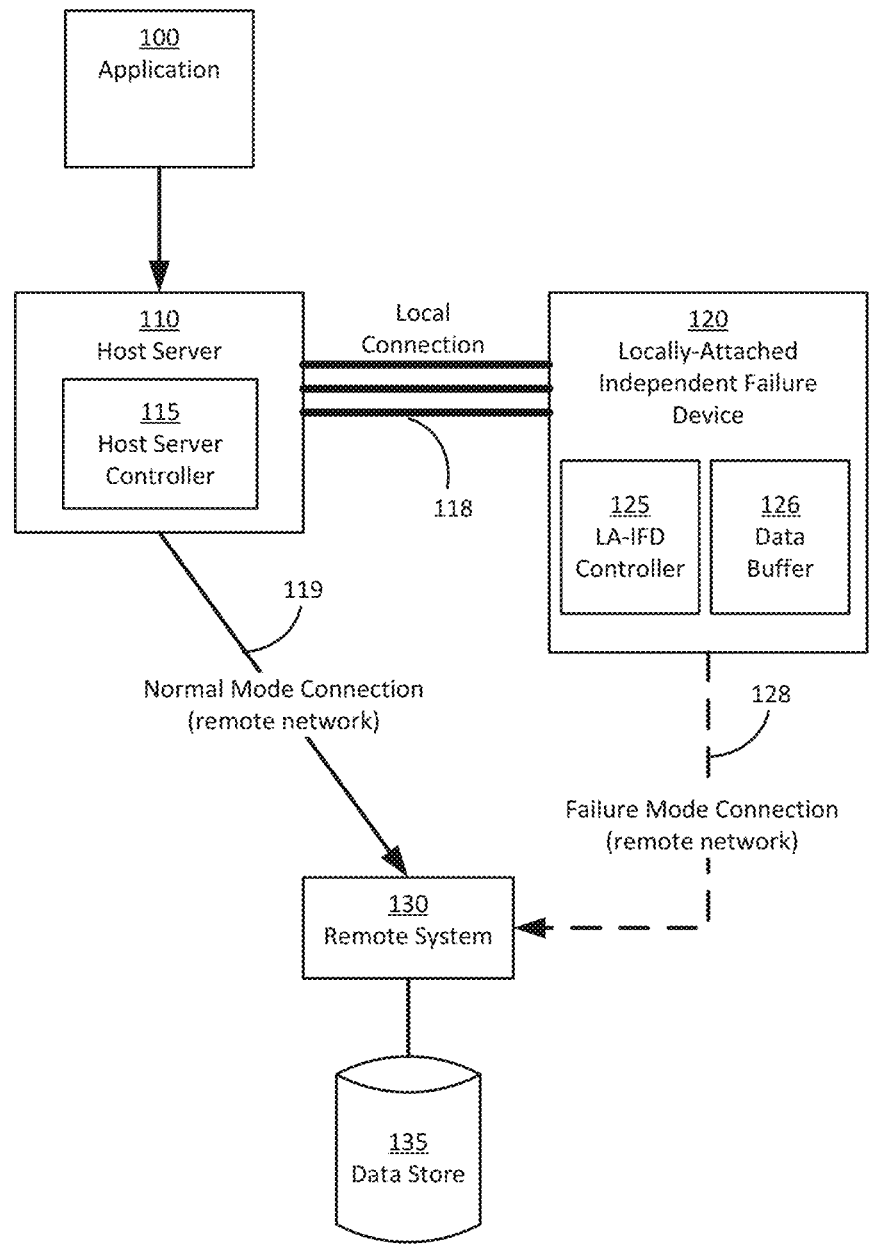
FIG. 1B shows an example component environment in which locally independent failure domains may be implemented.

Local independent failure domains can shrink the time an application and/or host server spends in blocking waits. FIG. 1B shows an example component environment in which local independent failure domains may be implemented. In FIG. 1B, an application 100 communicates with a host server 110. Generally, an application can be any computing process that interacts with a host server having cached or locally stored data to be replicated. An application 100 can include, for example, a website, web service, or a cloud-hosted version of a traditional desktop application, such as a word processor. An application can be an "application layer," such as an intermediate component that provides logic or data services to one or more other applications or application layers.

The host server 110 can be, for example, a physical or logical web server (e.g., a virtual server), a database server, or other server that provides or transforms data and/or provides computational services to an application 100. A host server 110 can also "host" the code or logic of an application or application layer 100, i.e., the processing instructions for the application 100 as well as some of its data may be present on the host server 110.

In an embodiment of the subject invention, host server 110 locally caches at least some data used by the application 100. Most applications need not only to read data, but also to update data (i.e., modify, add, or delete data, or metadata describing data) as part of their normal operational activities. As noted previously with respect to FIG. 1A, in many high-performance datacenter environments, processing and data storage services are distributed to improve scalability.

In an exemplary scenario, a host server 110 commits the updated data to a remote storage system 130. In some cases the remote storage system 130 may be comprised of several data stores 135 (e.g., disks or arrays of disks). Generally, a remote storage system 130 is either a persistent centralized data store for sharing data between several host servers, or a replicated data store used for geographic or network redundancy or for other data storage purposes. Even though a storage system may be referred to as a "remote storage system" herein, it may or may not be physically remote; the term as used herein merely means that it is distinct from one or more host servers and is accessed over a slower communications interface (e.g., an Ethernet network) than the locally-attached independent failure device of the subject invention.

The latency of the network connection 119 to the remote storage system 130 can introduce bottlenecks in processing, as described. Latency can occur as an intermediate problem due to loading of the network connection, equipment failures, or connection interruptions, but latency also generally occurs because network communications can be slower than communications between components using other kinds of interfaces. For example, a device connected over a Thunderbolt® interface can achieve 20 Gb/s I/O performance versus 1 Gb/s across the fastest Internet-based fiber networks.

Embodiments of the subject invention include a locally-attached independent failure device (LA-IFD) 120 connected to the host server 110 via a high-speed, low-latency local connection 118. The LA-IFD 120 can assume a variety of physical implementations, though in general an LA-IFD is a device that possesses its own independent power, compute, storage, and network connectivity and that can be connected to a host server via a high-speed communications bus. Components of particular note on the LA-IFD include, for example, an LA-IFD controller component 125 and a data buffer 126 for locally storing data from the host server during the "in-flight" period while data is being updated at the remote server.

An LA-IFD 120 may be implemented as a device 1000 described with reference to FIG. 6. Configurations of the LA-IFD and local connection can assume variety of forms. For example, an LA-IFD can be a microcontroller device or system-on-a-chip device with an adequately-sized data buffer 126, simple processing capability, and network connectivity for failure mode connectivity (e.g., 128). The microcontroller LA-IFD might, for example, connect via a special chip slot on a server motherboard, or may be adapted to use an interface port of a standardized interface such as PCIe or iSCSI. In some embodiments, the device may connect directly through a server DIMM slot.

The data buffer 126 can be implemented on any component of a device capable of storing data, for example a solid state drive (SSD), hard disk drive (HDD), RAM memory, flash memory, 3D Xpoint memory, phase change memory, or other type of computer readable media. In a preferable embodiment, the data buffer has a storage throughput and latency exceeding that of a high-speed network.

Figure 5A:
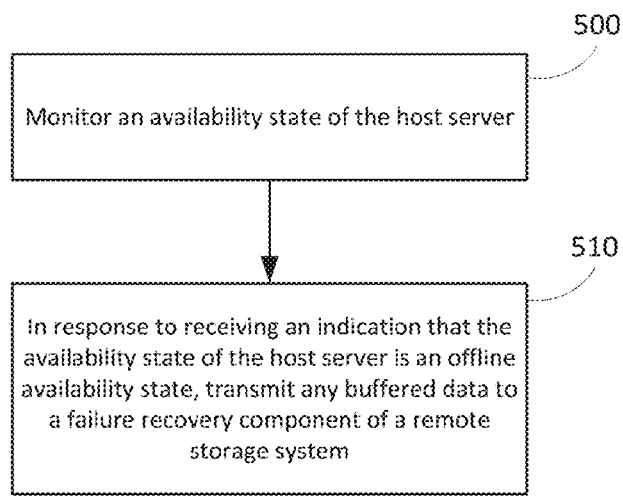
FIG. 5A shows an example process flow describing a failure mode where a host server of a connected host server/LA-IFD pair becomes unavailable.
Figure 5B:
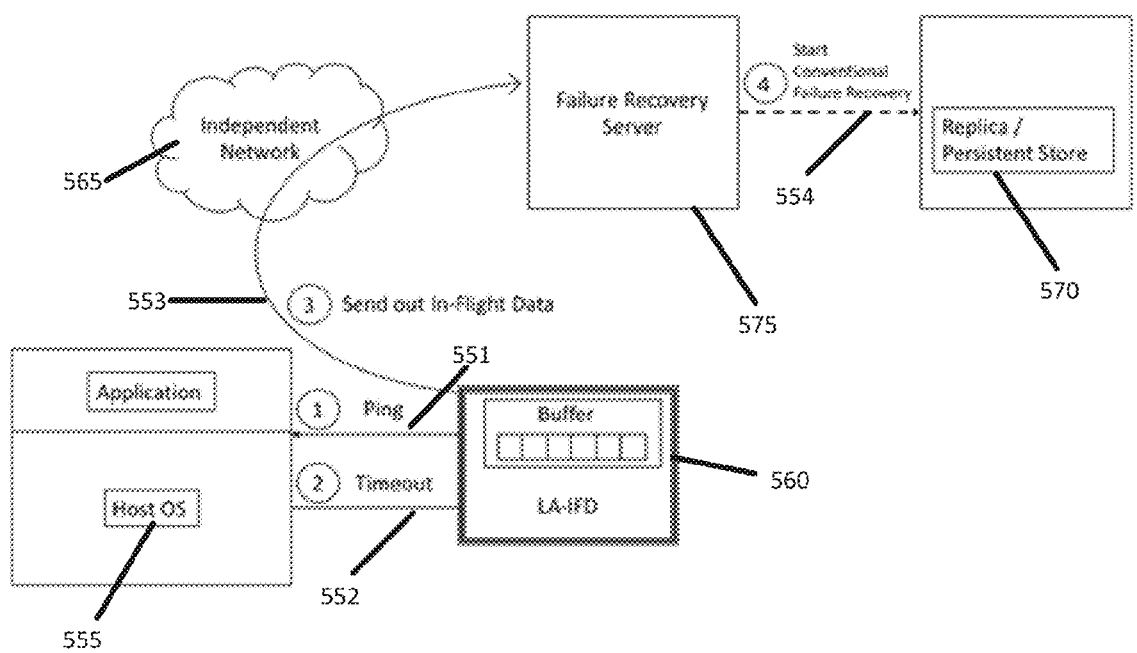
FIG. 5B shows an example component environment with communications flow between the components during an offline availability state of the host server.

An LA-IFD 120 preferably may be able to function independently of the host server it is connected to in case a technical problem causes the host server to cease to function (see, e.g., FIGS. 5A-5B and accompanying description). Thus, an LA-IFD could also be a device in its own housing placed outside the host server unit. The LA-IFD might contain a large amount of RAM memory, flash memory, etc., connected to the host server via a point-to-point attachment interface such as an Ethernet port (e.g., locally-connected though a high-speed router on a local subnet of network addresses), USB, HDMI, SATA/eSATA, a Thunderbolt port, a Firewire port, PCIe, or even as a SoDIMM.

Naturally, these configurations of the LA-IFD and local connection capabilities are exemplary, and other combinations may be envisioned by a practitioner in the art.

Figure 2A:
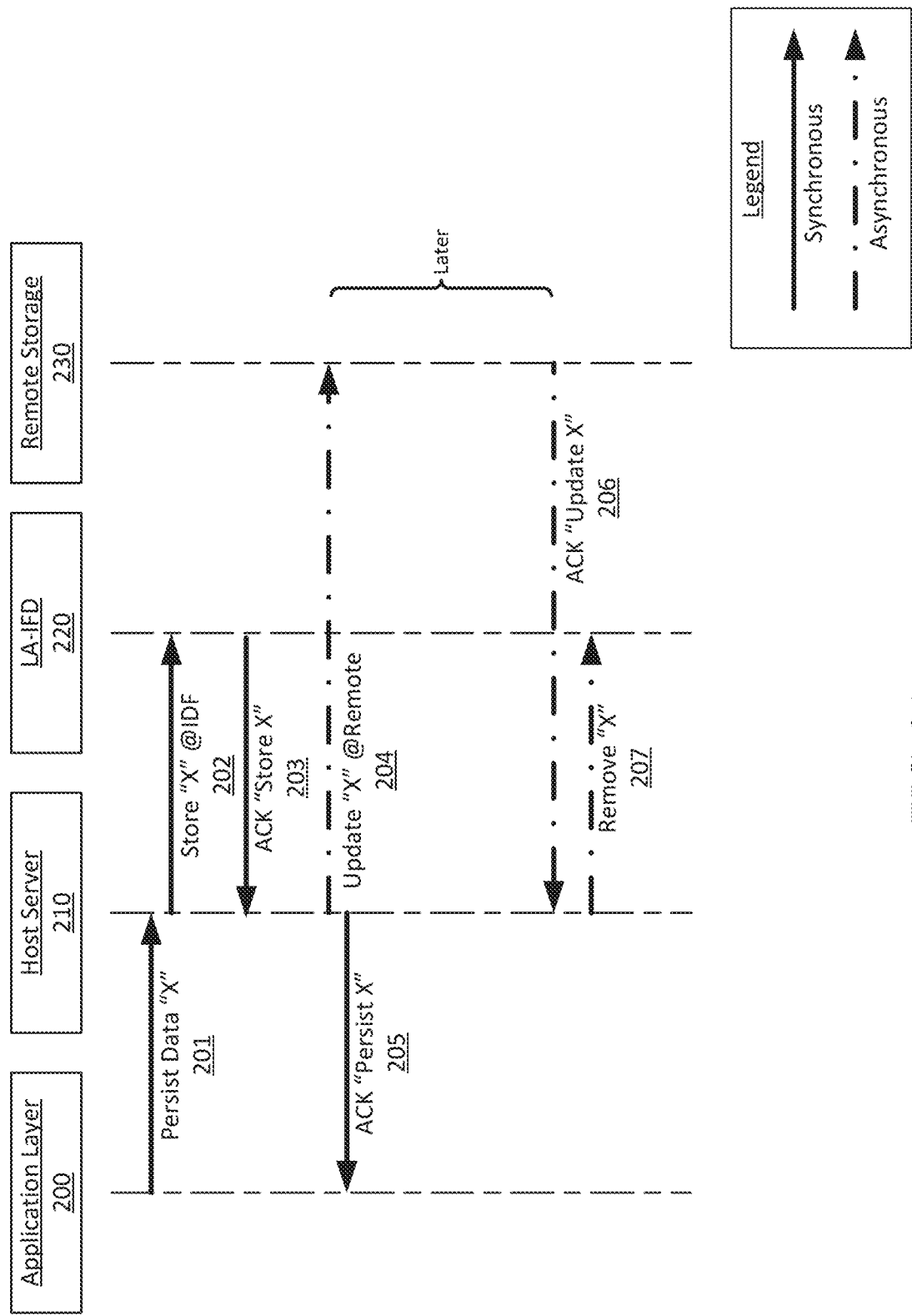
FIG. 2A shows a diagram of an example communications flow between components in an implementation of local independent failure domains.

A protocol for communications between the host server 110 and the LA-IFD 120 is described in more detail with respect to FIG. 2A. The communications protocol may be coordinated between components on the host server 110 (e.g., a host server controller 115) and components on the LA-IFD (e.g., an LA-IFD controller 125).

FIG. 1B shows components that may not be implemented in all embodiments of the subject invention; likewise, FIG. 1B may not show certain components present in some embodiments.

FIG. 2A shows a diagram of an example communications flow between components in an implementation of local independent failure domains. FIG. 2A shows environmental components as described in FIG. 1A, including an application 200, host server 210, LA-IFD 220, and remote storage system 230. Generally, the top to bottom flow down the diagram indicates ordering of the communications events, though the vertical distances between the arrows in the diagram are not intended to indicate any absolute or relative time period elapsing between the communication events.

Communications events are either synchronous or asynchronous, depicted in the diagram (and the "Legend") as solid and dot-dashed lines, respectively. In the diagram, when a request is issued according to a synchronous or asynchronous mode, the request's complementary acknowledgement (e.g., "ACK"), callback, or notification is issued according to the same mode with an opposite-ended arrow.

An "asynchronous" operation, function, or mode (e.g., a fetch) may be distinguished from a synchronous operation. In a synchronous operation, the instructions of the operation execute in a serial progression, where each instruction is completely performed prior to continuing to the next instruction or function. For example, when an instruction in function A calls a function B, function A waits for function B to complete the entirety of its instructions before function A continues with the instruction after the call to function B. In contrast, an asynchronous operation is characterized by return of control to the caller before the full scope of the operation has been completed. For example, if function B is an asynchronous function, function B immediately returns control to function A, even though function B may merely initiate the process of performing its work. In many implementations, an asynchronous operation may be performed by initiating an additional "thread" of execution according to existing mechanisms provided by the operating system. Further, in many instances, an asynchronous function has a paired notification mechanism (e.g., a "callback function" or event sender/event sink) for informing the calling process of the occurrence of intermediate or concluding activities, such as that the initiated operation has completed successfully or has failed.

Initially, an application/application layer 200 issues a request to persist a particular data segment (201), denoted as "X" in FIG. 2A. All the operations and communications depicted in the communications flow pertain to that particular data segment "X," which is intended to be exemplary. Naturally, in a busy high-performance datacenter environment, many thousands or millions of similar operations on individual data segments could be occurring per second.

Depending on the host server operating system (OS), software, hardware configuration, and other implementation details, a data segment may be configured in a variety of ways. For example, a data segment can be a file, subset of file, "page" (i.e., a unit of data of a particular granularity, such as 4K or 8K, often sized by the OS type or settings), word, byte, or even an application-defined memory structure.

Upon receipt of the request to persist the data, the host server 210 (or component thereof) initiates a synchronous call to the LA-IFD 220 to store the data segment (202). As this is a synchronous call, the calling thread at the host server 210 blocks while waiting for the storage request to be acknowledged as successful (203) before continuing operation on that thread of execution.

An update of the data segment is initiated at the remote storage system 230 as an asynchronous operation (204). Since this operation may be transmitted over high-latency networks, an asynchronous call is used so that the thread of execution on the host server does not block while waiting for the updated data to be transferred over the network and written to the remote storage device.

Since the remote storage update request (204) was initiated asynchronously, the host server 210 can almost immediately acknowledge completion of the "Persist X" request (205) to the requestor/calling application 200. Now that the data has been safely stored on the locally-attached device 220 and an update has been initiated at the remote storage, the application 200 can proceed having confirmation that its request has completed normally. Since the original persist data request (201) from the application was likely issued synchronously, the application 200 has been awaiting the completion acknowledgement (205) before unblocking its thread of execution and proceeding with processing.

As shown in the diagram, the request to update the remote storage system (204) may complete at a much later time due to network latencies, remote storage system load, device failures, and other factors. Only after completion of the request (204) will the remote storage system issue an acknowledgement (206) back to the host server 210. In general, however, the technical features of the subject invention make the amount of time that elapses between the issuance of the request (204) and the receipt of the acknowledgement (206) unimportant because the application 200 and/or host server 210 are not blocking any threads to wait for the acknowledgement.

Data segments that have been requested for update on the remote storage system but have not been acknowledged as complete may be called "in-flight" herein. In some circumstances, the size of the LA-IFD data buffer may be determined with consideration of the average "in-flight" time of data, e.g., the quantity of data stored over the in-flight time.

After the acknowledgement of the update at the remote storage, the data segment "X" has been persistently stored and/or replicated to its remote storage location. Therefore, the host server 210 can initiate removal of the data segment "X" (207) from its local temporary storage location on the LA-IFD 220. A removal request (207) may be initiated via a synchronous or asynchronous call almost immediately after the acknowledgment. The LA-IFD 220 may then remove the buffered copy of the data segment from its data buffer. In some embodiments, the removal request may take the form of a request to mark the buffered copy of the data segment for deletion at a later time, for example during a period housekeeping or flushing function that runs, e.g., on a time interval or during times of lower device usage. In some cases, rapid removal of data segments when they are no longer "in flight" may allow the LA-IFD to function with a relatively small amount of storage capacity in the data buffer.

As the communications flow in FIG. 2A indicates, local independent failure domains may improve blocking performance on a host server while maintaining expected scalability and data integrity levels. In contrast to traditional systems, applications may experience fewer overall operations within blocking synchronous calls in an environment implementing local independent failure domains. For example, blocking in the application layer occurs only between request 201 and acknowledgement 205; blocking in the host server only occurs between request 202 and request 203. In a traditional environment without local independent failure domains, the application and the host server would block for an entire synchronous update operation at the remote storage. Less time spent in blocking waits can improve both apparent performance for the user of the application and resource management/utilization (e.g., processor and memory usage) on the host server.

Figure 2B:
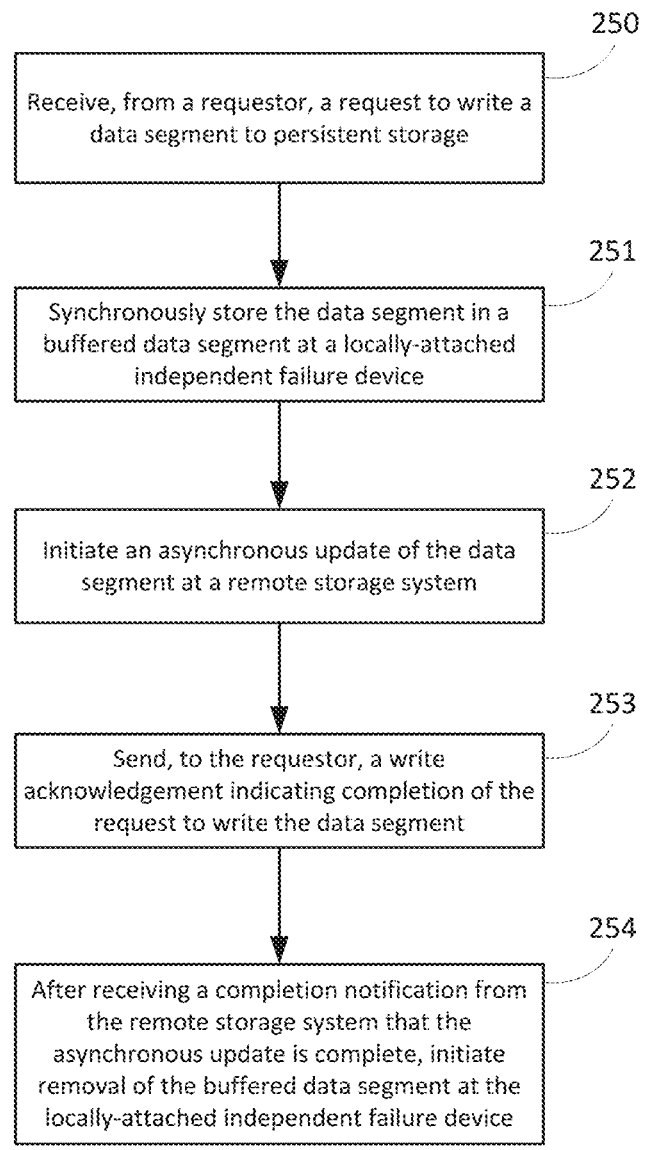
FIG. 2B shows an example process flow for components implementing local independent failure domains.

FIG. 2B shows an example process flow for components implementing local independent failure domains. The process flow in FIG. 2B may be implemented, for example, by a component of a host server as described herein.

Initially, a request to write a data segment to persistent storage is received from a requestor (e.g., an application layer) (250). The data segment is synchronously stored in a buffered data segment at an LA-IFD (251). The buffered data segment is generally a copy of the data segment being updated, providing an independent failure domain for the data in cases where the host server may fail before the data segment can be committed to persistent storage. In some cases the buffered data segment may be a copy of the command to transform an existing data segment into the updated/written data segment, for example an SQL command to modify data in a relational database.

An update of the data segment at a remote storage system is initiated (252) with an asynchronous call/request. This enables the host server component to send a write acknowledgement indicating completion of the request to write the data segment to the requestor (253). The requestor can then continue with its operations without blocking to wait for the update at the remote storage to complete.

After receiving a completion notification from the remote storage system that the asynchronous update is complete, the removal of the buffered data segment at the locally-attached independent failure device can be initiated (254). Removal of the copy of the data segment is acceptable now that the data segment has been safely committed to the persistent storage or replicated storage system.

Figure 3:
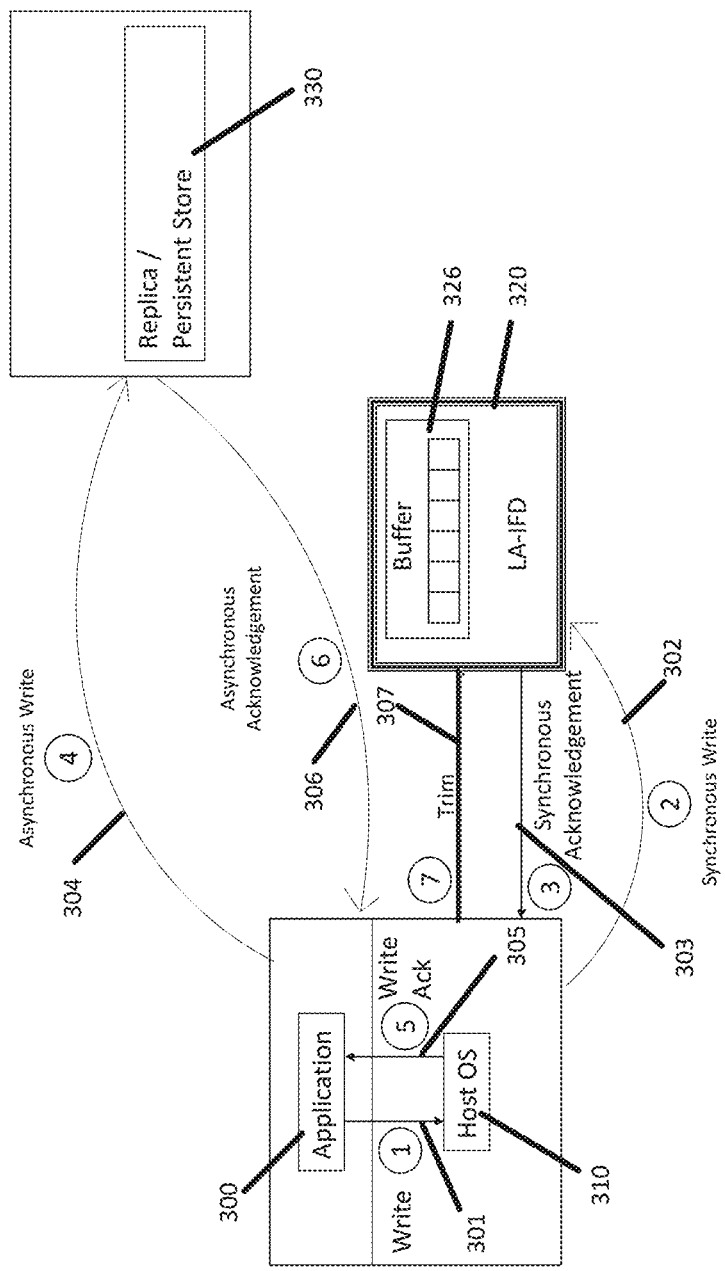
FIG. 3 shows an example component environment for implementing local independent failure domains and a communications flow between the components.

FIG. 3 shows an example component environment for implementing local independent failure domains and a communications flow between the components. In FIG. 3, application 300 issues a write request 301 to the host OS 310 (here, the application process is instantiated on the host server). As used herein, "Host OS" refers to a component of the host server operating system, e.g., a service, daemon, software layer, device driver, or even a kernel modification.

The host issues a synchronous write request 302 to the LA-IFD 320 to commit the data segment in the write request to its data buffer 326. After completion of the request to commit the data segment, the LA-IFD 320 issues an acknowledgement 303 back to the host 310. The host 310 can then initiate the asynchronous write 304 to the replica/persistent store 330 (i.e., remote storage system). Having stored the data segment locally in a temporary data buffer 326 and initiated the update to a replicated and/or persistent data storage device 330, the host 310 can then acknowledge completion of the write request 305 to the requestor application 300.

At a later time, after the replica/persistent store 330 receives and completes the update to the data segment, it sends a completion notification 306 to the host 310. At that time, the host 310 can initiate removal (e.g., "Trim") 307 of the buffer 326 on the LA-IFD 320. This communications flow between components is exemplary of operations that may occur for any particular update of data cached by a host during normal operational mode of a local independent failure domain; the communications flow may be repeated multiple times each second in a high-volume datacenter environment.

While FIGS. 2A-2B and FIG. 3 illustrate local independent failure domains in normal operational modes, malfunction or total failure of an LA-IFD and/or host server are possible. FIGS. 4A-4B and 5A-5B show failure or "offline" modes of operation for the LA-IFD and host server, respectively.

Figure 4A:
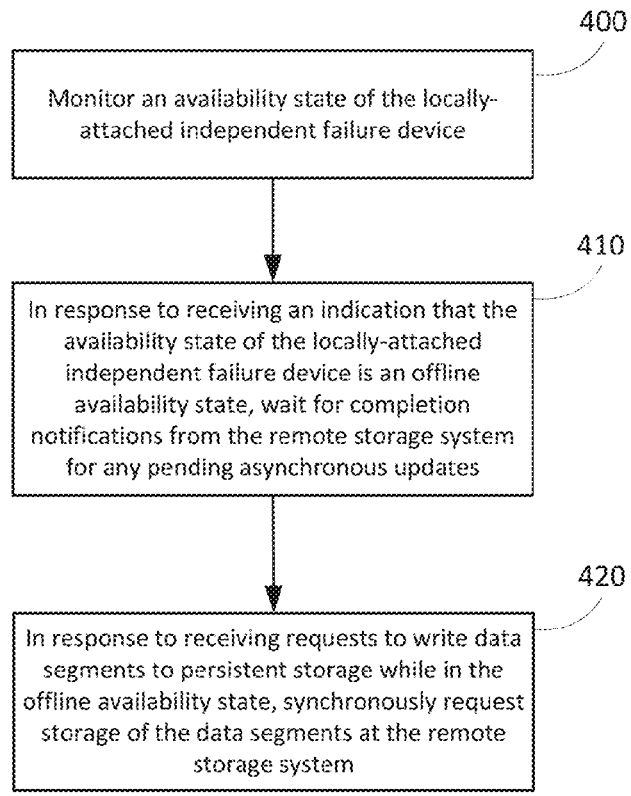
FIG. 4A shows an example process flow describing a failure mode where an LA-IFD of a connected host server/LA-IFD pair becomes unavailable.

FIG. 4A shows an example process flow describing a failure mode where an LA-IFD of a connected host server and LA-IFD pair becomes unavailable. The process flow in FIG. 4A may be implemented by a host server device as described herein. In FIG. 4A, a host server and the LA-IFD exchange telemetry data indicating the availability state of the LA-IFD. A component in the environment (e.g., the host server) monitors the availability state of the LA-IFD (400). The telemetry data exchange includes at least a "ping" from the host server directed at the LA-IFD; if the LA-IFD has not responded to the "ping" within a given (e.g., configurable) time period, the host server may conclude from this indication that the LA-IFD is in an offline availability state.

In response to the indication that the LA-IFD is in an offline availability state, the host server waits for completion notifications from the remote storage system for any pending asynchronous updates (410). This enables the host server to complete its processing for any outstanding or "in flight" updates. In most cases, since the LA-IFD is no longer available, removal of the buffered data segment on the LA-IFD is no longer initiated by the host server during the offline state.

When the host server receives requests to write data segments to persistent storage while the LA-IFD is in the offline availability state, the host server changes its mode of directing storage requests to the remote storage system to synchronous instead of asynchronous (420). The host server waits for the synchronous requests to complete before sending the write acknowledgement indicating completion of the requests to the requestor application. The host server also, naturally, no longer directs requests to the offline LA-IFD.

Figure 4B:
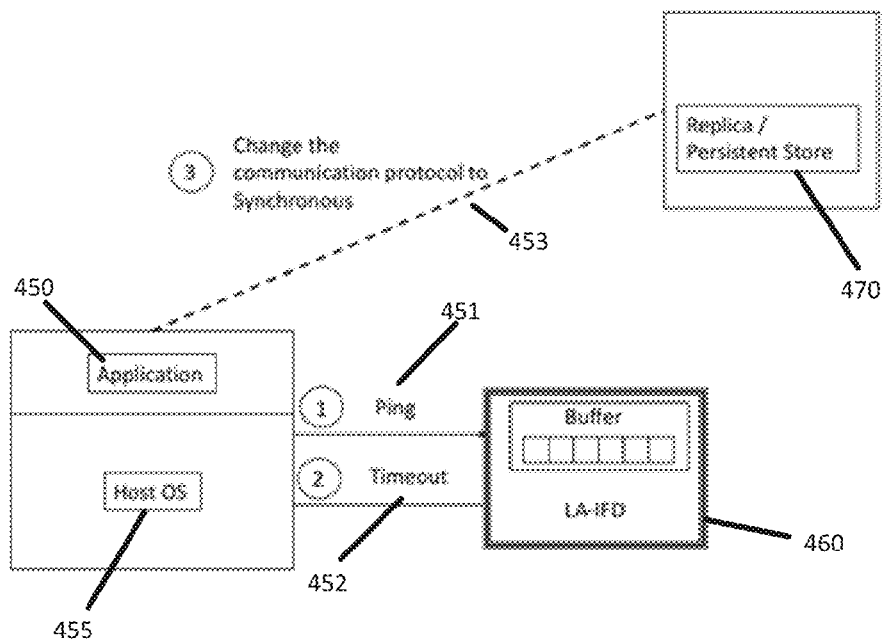
FIG. 4B shows an example component environment with communications flow between the components during an offline availability state of the LA-IFD.

FIG. 4B shows an example component environment with communications flow between the components during an offline availability state of the LA-IFD. In FIG. 4B, the host 455 (e.g., OS or component thereof) exchanges heartbeat messages (451) with the LA-IFD 460 to check its availability periodically or continuously. If a ping message sent by the host 455 is not responded to by the LA-IFD 460 within a timeout period 452, the host 455 transitions to an "LA-IFD offline availability state." In some embodiments, the timeout period is shorter than the average remote storage system latency. In some embodiments, the timeout period is configurable.

In the offline availability state, the host changes future update requests to the replica/persistent store 470 to synchronous 453. Thus, application 450 may experience greater latency while update operations complete. Furthermore, the host 455 also waits to receive the completion notifications for in-flight asynchronous updates to arrive, as described in FIG. 4A. In some implementations, the host 455 may also post a notification to a log or notification display device to inform datacenter personnel or systems of the failure or malfunction of the LA-IFD.

FIG. 5A shows an example process flow describing a failure mode where a host server of a connected host server and LA-IFD pair becomes unavailable. The process flow in FIG. 5A may be implemented by an LA-IFD device as described herein. In FIG. 5A, an LA-IFD and a host server exchange telemetry data indicating the availability state of the host server. A component in the environment (e.g., the LA-IFD) monitors the availability state of the host server (500). In an embodiment where the LA-IFD monitors the availability state of the host server, the LA-IFD may require its own power, processing system, and network connectivity independently of the host server device.

The telemetry data exchange includes at least a "ping" from the LA-IFD directed at the host server; if the host server has not responded to the "ping" within a given (e.g., configurable) time period, the LA-IFD may conclude from this indication that the host server is in an offline availability state.

In response to the indication that the host server is in an offline availability state, the LA-IFD transmits to a failure recovery component of a remote storage system any buffered data (e.g. "in-flight" data) that it has stored in its data buffer (510) (e.g., any extant data in the data buffer that has not been marked for removal). Generally, a failure recovery component coordinates and synchronizes update activities with the remote storage system when a failure exists. Depending on the implementation, a failure recovery component can reside on a device of the remote storage system itself, or may be an independent device/server. In some cases, the LA-IFD may establish a network connection to a remote or independent network on which the failure recovery component of remote storage system resides. In some cases, this network connection may be selected to be independent of the network connection normally established by the failed host server.

FIG. 5B shows an example component environment with communications flow between the components during an offline availability state of the host server. In FIG. 5B, the LA-IFD 560 exchanges heartbeat messages (551) with host 555 to check its availability periodically or continuously. If a ping message sent by the LA-IFD 560 is not responded to by the host 555 within a timeout period (552), the LA-IFD 560 transitions to a "host server offline availability state."

In the offline availability state, the LA-IFD transmits any buffered data (e.g., "in-flight" data) (553) to a failure recovery component (e.g., a server) 575. In the example of FIG. 5B, the LA-IFD establishes an independent network connection 565 to the failure recovery server 575. The failure recovery server 575 may then initiate a failure recovery process (554) by coordinating and synchronizing activities related to the transmitted, buffered data with the replica/persistent store 570 (i.e., remote storage system). In some implementations, the LA-IFD 560 may also post a notification to a log or notification display device to inform datacenter personnel or systems of the failure or malfunction of the host server.

Figure 6:
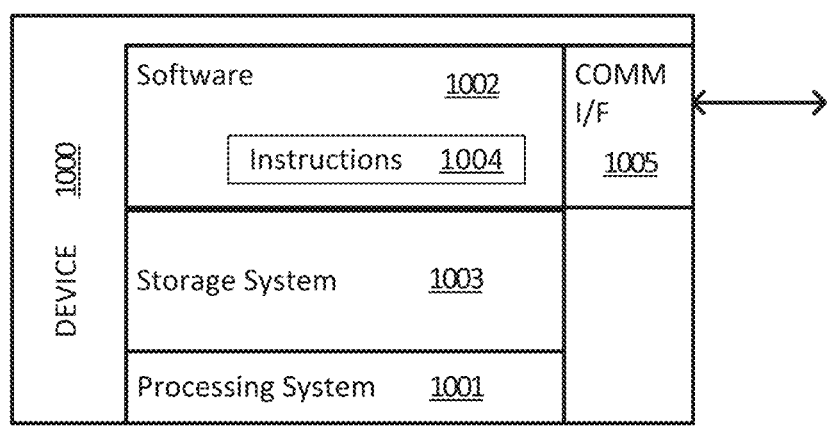
FIG. 6 shows a block diagram illustrating components of a computing device or system used in some implementations or embodiments incorporating techniques and systems for local independent failure domains as described herein.

FIG. 6 shows a block diagram illustrating components of a computing device or system used in some implementations or embodiments incorporating techniques and systems for local independent failure domains. For example, any component of the system, including a LA-IFD and a host server controller, may be implemented as described with respect to device 1000, which can itself include one or more computing devices. The hardware can be configured according to any suitable computer architectures such as a Symmetric Multi-Processing (SMP) architecture or a Non-Uniform Memory Access (NUMA) architecture.

The device 1000 can include a processing system 1001, which may include a processing device such as a central processing unit (CPU) or microprocessor and other circuitry that retrieves and executes software 1002 from storage system 1003. Processing system 1001 may be implemented within a single processing device but may also be distributed across multiple processing devices or sub-systems that cooperate in executing program instructions.

Examples of processing system 1001 include general purpose central processing units, application specific processors, and logic devices, as well as any other type of processing device, combinations, or variations thereof. The one or more processing devices may include multiprocessors or multi-core processors and may operate according to one or more suitable instruction sets including, but not limited to, a Reduced Instruction Set Computing (RISC) instruction set, a Complex Instruction Set Computing (CISC) instruction set, or a combination thereof. In certain embodiments, one or more digital signal processors (DSPs) may be included as part of the computer hardware of the system in place of or in addition to a general purpose CPU.

Storage system 1003 may comprise any computer readable storage media readable by processing system 1001 and capable of storing software 1002 including, e.g., processing instructions for implementing local independent failure domains Storage system 1003 may include volatile and nonvolatile, removable and non-removable media implemented in any method or technology for storage of information, such as computer readable instructions, data structures, program modules, or other data.

Examples of storage media include random access memory (RAM), read only memory (ROM), magnetic disks, optical disks, CDs, DVDs, flash memory, solid state memory, phase change memory, 3D-Xpoint memory, or any other suitable storage media. Certain implementations may involve either or both virtual memory and non-virtual memory. In no case do storage media consist of a propagated signal. In addition to storage media, in some implementations, storage system 1003 may also include communication media over which software 1002 may be communicated internally or externally.

Storage system 1003 may be implemented as a single storage device but may also be implemented across multiple storage devices or sub-systems co-located or distributed relative to each other. Storage system 1003 may include additional elements capable of communicating with processing system 1001.

Software 1002 may be implemented in program instructions and, among other functions, may, when executed by device 1000 in general or processing system 1001 in particular, direct device 1000 or processing system 1001 to operate as described herein for implementing local independent failure domains. Software 1002 may provide program instructions 1004 that implement components for enabling local independent failure domains. Software 1002 may implement on device 1000 components, programs, agents, or layers that implement in machine-readable processing instructions 1004 the methods and techniques described herein.

In general, software 1002 may, when loaded into processing system 1001 and executed, transform device 1000 overall from a general-purpose computing system into a special-purpose computing system customized to provide local independent failure domains in accordance with the techniques herein. Indeed, encoding software 1002 on storage system 1003 may transform the physical structure of storage system 1003. The specific transformation of the physical structure may depend on various factors in different implementations of this description. Examples of such factors may include, but are not limited to, the technology used to implement the storage media of storage system 1003 and whether the computer-storage media are characterized as primary or secondary storage. Software 1002 may also include firmware or some other form of machine-readable processing instructions executable by processing system 1001. Software 1002 may also include additional processes, programs, or components, such as operating system software and other application software.

Device 1000 may represent any computing system on which software 1002 may be staged and from where software 1002 may be distributed, transported, downloaded, or otherwise provided to yet another computing system for deployment and execution, or yet additional distribution. Device 1000 may also represent other computing systems that may form a necessary or optional part of an operating environment for the disclosed techniques and systems, e.g., remote storage system or failure recovery server.

A communication interface 1005 may be included, providing communication connections and devices that allow for communication between device 1000 and other computing systems (not shown) over a communication network or collection of networks (not shown) or the air. Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned communication media, network, connections, and devices are well known and need not be discussed at length here.

It should be noted that many elements of device 1000 may be included in a system-on-a-chip (SoC) device. These elements may include, but are not limited to, the processing system 1001, a communications interface 1005, and even elements of the storage system 1003 and software 1002.

Alternatively, or in addition, the functionality, methods and processes described herein can be implemented, at least in part, by one or more hardware modules (or logic components). For example, the hardware modules can include, but are not limited to, application-specific integrated circuit (ASIC) chips, field programmable gate arrays (FPGAs), system-on-a-chip (SoC) systems, complex programmable logic devices (CPLDs) and other programmable logic devices now known or later developed. When the hardware modules are activated, the hardware modules perform the functionality, methods and processes included within the hardware modules.

It should be understood that the examples and embodiments described herein are for illustrative purposes only and that various modifications or changes in light thereof will be suggested to persons skilled in the art and are to be included within the spirit and purview of this application.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

All patents, patent applications, provisional applications, and publications referred to or cited herein (including those in the "References" section) are incorporated by reference in their entirety, including all figures and tables, to the extent they are not inconsistent with the explicit teachings of this specification.

What is claimed is:

1. A method for enabling local independent failure domains, the method comprising:
   receiving, from a requestor application, a request to write a data segment to a persistent storage;
   synchronously storing the data segment in a buffered data segment at a locally-attached independent failure device and initiating an asynchronous update of the data segment at a remote storage system;
   sending, to the requestor application, a write acknowledgement indicating completion of the request to write the data segment; and
   after receiving a completion notification from the remote storage system that the asynchronous update is complete, initiating removal of the buffered data segment at the locally-attached independent failure device.

2. A system for enabling local independent failure domains, the system comprising:
   one or more computer readable storage media;
   program instructions stored on the one or more computer readable storage media that, when executed by a processing system, direct the processing system to:
   monitor an availability state of a locally-attached independent failure device;
   when the availability state of the locally-attached independent failure device is a normal availability state, in response to receiving, from a requestor application, a request to write a data segment to a persistent storage:
   synchronously storing the data segment in a buffered data segment at the locally-attached independent failure device and initiating an asynchronous update of the data segment at a remote storage system;
   sending, to the requestor application, a write acknowledgement indicating completion of the request to write the data segment; and
   after receiving a completion notification from the remote storage system that the asynchronous update is complete, initiating removal of the buffered data segment at the locally-attached independent failure device.

3. The system of claim 2, further comprising program instructions that, when executed by the processing system, direct the processing system to:
   in response to receiving an indication that the availability state of the locally-attached independent failure device is an offline availability state, wait for completion notifications from the remote storage system for any pending asynchronous updates; and
   in response to receiving requests to write data segments to persistent storage while the locally-attached independent failure device is in the offline availability state, synchronously request storage of the data segments at the remote storage system.

4. The system of claim 2, wherein the monitoring of the availability state of the locally-attached independent failure device comprises sending a ping request to the locally-attached independent failure device and waiting a configurable time period for a response to the ping request.

5. A locally-attached independent failure apparatus for enabling local independent failure domains, the apparatus comprising:
   a processing system;
   one or more computer readable media;
   a network interface;
   a local communications interface for attaching to a host server;
   program instructions stored on the one or more computer readable media that, when executed by the processing system, direct the processing system to:
   in response to receiving a store request from the host server to store a data segment, synchronously store the data segment in a data buffer stored on the one or more computer readable media; and in response to receiving a removal request from the host server to remove a previously-stored data segment, removing the previously-stored data segment from the data buffer.

6. The apparatus of claim 5, further comprising program instructions that, when executed by the processing system, direct the processing system to:

monitor an availability state of the host server; and in response to receiving an indication that the availability state of the host server is an offline availability state, transmit, via the network interface, any buffered data in the data buffer to a failure recovery component of a remote storage system.

7. The apparatus of claim 5, wherein the local communications interface comprises a PCIe interface.

8. The apparatus of claim 5, wherein the local communications interface comprises a point-to-point attachment interface.

9. The apparatus of claim 5, wherein the local communications interface comprises a main memory interface of the host server.

10. The apparatus of claim 5, wherein the data buffer is stored in a RAM memory of the one or more computer readable media.

11. The apparatus of claim 5, wherein the monitoring of the availability state of the host server comprises sending a ping request to the host server and waiting a configurable time period for a response to the ping request.

12. The apparatus of claim 5, wherein the removing of the previously-stored data segment from the data buffer comprises marking the data segment for deletion from the data buffer during a subsequent data buffer flushing operation.

* * * * *